United States Patent [19]

Coats

[11] Patent Number: 5,233,153
[45] Date of Patent: Aug. 3, 1993

[54] METHOD OF PLASMA SPRAYING OF POLYMER COMPOSITIONS ONTO A TARGET SURFACE

[75] Inventor: Alma L. Coats, Salt Lake City, Utah
[73] Assignee: EDO Corporation, College Point, N.Y.
[21] Appl. No.: 819,180
[22] Filed: Jan. 10, 1992
[51] Int. Cl.$^5$ ............................................. B23K 9/00
[52] U.S. Cl. ........................... 219/121.47; 219/76.16; 219/121.510; 219/121.59; 427/446
[58] Field of Search ..................... 219/121.56, 121.54, 219/121.47, 121.59, 121.5, 76.16; 427/34

[56] References Cited

U.S. PATENT DOCUMENTS

| | | | |
|---|---|---|---|
| 3,179,784 | 4/1965 | Johnson | 219/121.47 |
| 3,676,638 | 7/1972 | Stand | 219/76.16 |
| 3,803,380 | 4/1974 | Ragaller. | |
| 3,839,618 | 10/1974 | Muehlberger. | |
| 3,851,140 | 11/1974 | Coucher. | |
| 3,914,573 | 10/1975 | Muehlberger. | |
| 3,988,566 | 10/1976 | Vogts et al. | 219/121.54 |
| 4,140,892 | 2/1979 | Müller. | |
| 4,199,104 | 4/1980 | Houben | 219/76.16 |
| 4,336,276 | 6/1982 | Bill et al. . | |
| 4,389,559 | 6/1983 | Rotolico et al. . | |
| 4,500,038 | 2/1985 | DeFarrari et al. . | |
| 4,505,945 | 3/1985 | Dubust et al. . | |
| 4,579,282 | 4/1986 | Navara et al. . | |
| 4,596,718 | 6/1986 | Gruner. | |
| 4,621,183 | 11/1986 | Takeuchi. | |
| 4,661,682 | 4/1987 | Gruner et al. . | |
| 4,670,290 | 6/1987 | Itoh et al. . | |
| 4,683,148 | 7/1987 | Rairden. | |
| 4,694,990 | 9/1987 | Karlsson et al. | 219/76.16 |
| 4,727,236 | 2/1988 | Hull et al. . | |
| 4,741,286 | 5/1988 | Itoh et al. . | |
| 4,745,256 | 5/1988 | Shubert. | |
| 4,818,837 | 4/1989 | Pfender. | |
| 4,853,250 | 8/1989 | Boulos et al. . | |
| 4,853,515 | 8/1989 | Willen et al. . | |
| 4,865,252 | 9/1989 | Rotolico et al. . | |
| 4,866,240 | 9/1989 | Webber. | |
| 4,877,937 | 10/1989 | Müller. | |
| 4,896,017 | 1/1990 | Koppel et al. . | |
| 4,897,282 | 1/1990 | Kniseley et al. . | |
| 4,902,870 | 2/1990 | Frind et al. . | |
| 4,928,879 | 5/1990 | Rotolico. | |
| 4,948,485 | 8/1990 | Wallsten et al. . | |
| 4,958,767 | 9/1990 | Labrot et al. . | |
| 4,970,364 | 11/1990 | Müller et al. . | |
| 4,982,067 | 1/1991 | Marantz et al. . | |
| 4,990,739 | 2/1991 | Zaplatynaky. | |
| 5,008,511 | 4/1991 | Ross. | |
| 5,013,883 | 5/1991 | Fuimefredd et al. . | |
| 5,032,568 | 7/1991 | Lau et al. . | |
| 5,039,547 | 8/1991 | Jung. | |
| 5,043,548 | 8/1991 | Whitney et al. . | |
| 5,046,145 | 9/1991 | Drouet. | |
| 5,047,612 | 9/1991 | Sarkar et al. | 219/121.47 |
| 5,051,557 | 9/1991 | Satzger. | |

FOREIGN PATENT DOCUMENTS 0171793 8/1985 European Pat. Off. .

*Primary Examiner*—Mark H. Paschall
*Attorney, Agent, or Firm*—Thorpe North & Western

[57] ABSTRACT

A method of plasma spraying of polymer compositions is disclosed for use with a plasma spray system having a cathode and anode for developing an electric arc in the presence of an ionizable gas and in response to input electrical power whose magnitude may be selectively varied, an ionizable plasma gas source for supplying gas at selectable rates to the cathode and anode to produce a plasma jet which issues from a nozzle, a carrier gas source for supplying carrier gas to the plasma jet at selectable velocities and rate and at selectable locations downstream of the nozzle, and a feeder for feeding polymer composition particles to the carrier gas at selectable rates so that the carrier gas may deliver the particles to the plasma jet. The method includes operating the plasma spray system to direct the plasma jet, with particles, toward a target surface to coat the surface, and controlling the magnitude of the electrical power, the plasma gas supply rate, and the carrier gas supply velocity, and controlling the location of supply of the carrier gas, with polymer composition particles, to the plasma jet so that the particles are melted and delivered to the target surface before refusing or chain scissioning.

11 Claims, 1 Drawing Sheet

METHOD OF PLASMA SPRAYING OF POLYMER COMPOSITIONS ONTO A TARGET SURFACE

BACKGROUND OF THE INVENTION

This invention relates to a method of plasma spraying of polymer compositions onto a substrate or other surface, and in particular to such a method in which selected parameters of the plasma spraying process are controlled so as to melt the polymer composition and deliver it to the substrate or other surface before either re-fusing or chain scissioning of the composition. The invention also relates to a new use and operation of an existing plasma spray system for spraying polymers onto a target surface to provide a well-consolidated, dense and void-free coating for the surface.

Devices for generating plasma streams or jets have been used for some time to spray heat fusible materials, primarily metals, ceramics, cermets (combinations of metals and ceramics), and carbides onto a substrate or work piece. See, for example, U.S. Pat. Nos. 5,047,612, 4,970,364, 4,866,240, 4,741,286, 4,505,945, 4,670,290, 4,896,017 and 5,013,883, and the references cited therein. Such devices typically include a cathode and a combination anode and nozzle for generating an electric arc in an ionizable gas upon application of an electric current to the cathode and anode. The ionizable gas, referred to as "plasma gas" hereafter, is passed under pressure into the space between the cathode and anode as a result of which electrons are stripped from the gas to ionize it and thus produce a high energy, high temperature plasma jet which issues from the anode/nozzle. Heat fusible particulate materials are introduced into the plasma jet generally by an inert carrier gas, where the particles are softened or melted while also being accelerated to high velocities. The softened or melted particles are then projected or sprayed onto a substrate or work piece to coat the substrate or work piece. Such coatings serve a variety of purposes including wear resistance, electrical or heat insulation, electrical conduction, friction reduction, corrosion resistance, etc.

Because the particulate materials sprayed with the above-described plasma spray devices have relatively high melting points, the devices are operated to generate especially high temperature plasma jets so that the materials, when introduced into the plasma jet, will melt or nearly melt and remain in that state until they strike the target surface. Because of this, the few attempts to utilize these prior art devices for plasma spraying of polymers, which have relatively low melting points, have met with limited success. Any resulting coatings are degraded, uneven, full of voids, and generally inadequate for the purposes for which the coatings are applied. However, because of the many desirable properties of polymers and polymer coatings (based on experience applying the coatings using other techniques), there is great interest in finding an economical and consistently reproducible solution to the polymer vaporization and degradation problem in plasma spraying of polymers.

Two approaches to solving the above-described problem have been suggested, one in U.S. Pat. No. 4,694,990, and the other in U.S. Pat. No. 5,041,713. In the first mentioned patent, the approach suggested is to include a baffle or flame barrier between the source of the plasma jet and the location of introduction of the particulate material into the plasma jet, to thereby attempt to reduce the combustion or oxidation of the material. However, use of such a barrier would appear to reduce plasma jet velocity and so reduce the rate at which polymers can e applied to a substrate. Further, with the reduction of plasma jet velocity, the coatings applied do not adhere as well to the substrate since bond strength is, in part, dependent upon speed of impact of the coating material. Finally, provision of such a barrier increases the cost and decreases the reliability of the plasma spray system, and also decreases the precision of the spraying process as to uniformity and thickness of the coatings.

In U.S. Pat. No. 5,041,713, the approach taken to avoiding overheating of the polymers is to vary the location downstream of the nozzle at which the polymers are injected into the plasma jet while also attempting to cool the plasma jet by use of a fluid-cooled nozzle which employs both a cooling liquid and a cooling gas. It has been found, however, that simply cooling of the nozzle and varying the location of injection of the polymers into the plasma jet is generally insufficient to ensure that the polymers both melt and are delivered to the target surface before re-fusing, chain scissioning, combusting or vaporizing. Generally, the approach in the '713 patent lacks the versatility to allow for the successful plasma spraying of a wide variety of polymers.

Although not mentioned in the above two referenced patents, others have suggested that for plasma flame spraying of metals and ceramics, control of some parameters of the plasma spraying process would serve to allow for softening the metal and/or ceramic particles without melting the particles, and then for delivering the particles to a surface to be coated. In particular, U.S. Pat. No. 3,914,573 discloses the process of controlling the dwell time of particles in a plasma stream by controlling the angle and position of injection of the particles into the stream at the throat of the nozzle of the plasma spray gun. The "throat" is defined in the patent as that area within the nozzle between the source of the plasma stream and the exit point of the nozzle. The angle and position of injection of the particles is changed by changing nozzles having different angles and positions for the injection conduit. For plasma spraying of metals and ceramics, such an approach to controlling the softening of the metal and ceramic particles may be acceptable, but it would not be acceptable nor even workable for plasma spraying of polymers because their melting points are generally lower than those of metallics and ceramics. Injection at the location indicated in the nozzle throat of the '573 patent would likely result in the polymers being vaporized or at least thermally degraded so that any resulting coating would not serve the purposes desired. This is because the temperature of the plasma stream in the nozzle throat would be too high.

The plasma stream exit velocity in the '573 patent, suggested at between Mach 1 and Mach 3, with Mach 2 being preferred, would seemingly assist in rapidly delivering the coating material to the substrate before vaporization could take place. However, with polymers, such velocities would still not likely be sufficient to prevent vaporization o thermal degradation before the polymers could reach and coat the substrate. In other words, the approach recommended by the '573 patent for plasma spraying of metals and ceramics would generally not work for spraying polymers.

In general, the prior art, although acknowledging the desirability of plasma spraying of polymers to coat substrates and other surfaces, fails to appreciate the critical parameters in the plasma spraying process which will yield polymer coatings having the desired characteristics. It is important that the polymers, after melting, be maintained in the melt state so as not to either re-fuse (solidify) or chain scission (breaching or breaking of the chain structure of the polymer) before striking the surface to be coated. Polymers can be damaged or degraded at a temperature short of combustion or vaporization. Such damage (chain scissioning) can occur from a combination of too much heat over too long a period of time (the greater the heat, the less time is required, and vice versa). The prior art has failed to recognize that these critical events and phases in the plasma spraying of polymers may be achieved and maintained by carefully controlling selected parameters of the plasma spraying process to thereby effectively and efficiently plasma spray a variety of polymer coatings onto target surfaces.

SUMMARY OF THE INVENTION

It is an object of the invention to provide a new, efficient and effective method of plasma spraying of polymer compositions onto a target surface.

It is a further object of the invention to provide such a method in which the resulting coating is well compacted, dense and substantially void free.

It is another object of the invention to provide such a method whereby the parameters of the plasma jet and the introduction of polymers into the plasma jet are controlled to melt the polymers and deliver them to a target surface before the polymers can re-fuse or chain scission.

It is also an object of the invention to provide a method of operating a plasma spray system adapted for spraying a variety of polymers and polymer compositions onto a substrate or other surface.

It is an additional object of the invention to provide such a method which overcomes the problems of the prior art approaches without reducing the coating material throughput or spray rate of the plasma spraying process.

It is still another object of the invention to provide such a method for plasma spraying of polymers onto a target surface without the need for complicated, cumbersome or specially designed cooling equipment.

The above and other objects of the invention are realized in a specific illustrative method of plasma spraying of polymer compositions utilizing a plasma spray system in which selected parameters are precisely controlled so that polymer composition particles are melted and delivered to a target substrate before the particles re-fuse or chain scission. An exemplary plasma spray system suitable for use with the present invention includes a cathode and anode/nozzle arrangement for developing an electric arc in the presence of ionizable gas when supplied with electrical power whose magnitude may be selectively varied. Also included is a plasma (ionizable) gas source for supplying plasma gas to the cathode and anode/nozzle arrangement at selectable rates to thereby produce a plasma jet which issues from the anode/nozzle, a carrier gas source for supplying carrier gas to the plasma jet at selectable velocities and rates and at selectable angles and locations downstream of the nozzle, and a feeding device for feeding polymer composition particles to the carrier gas at selectable rates so that the particles are ultimately delivered to the plasma jet.

In the method of the present invention, the magnitude of the electrical power supplied to the cathode and anode/nozzle, and the rate of supply of plasma gas may be varied to develop a plasma jet whose temperature is sufficiently high to melt the polymer composition particles upon their introduction into the plasma jet. The location downstream of the anode/nozzle of introduction of the particles into the plasma jet and the depth or radial distance of penetration of the particles into the plasma jet are adjusted so that the particles melt but do not re-fuse or chain scission prior to striking the target surface to be coated. The temperature of the plasma jet drops fairly dramatically from the anode/nozzle downstream and from the center of the plasma jet radially outwardly. Thus, controlling the plasma jet temperature, the location downstream of the anode/nozzle of injection of the particles, and the depth of injection of the particles into the plasma jet allow for more precise control of the heating of the polymer particles to melt the particles but avoid chain scissioning or re-fusing thereof before they strike the target surface.

The depth of penetration of the polymer particles into the plasma jet may be controlled by controlling the angle of injection of the particles into the jet, and the velocity of the carrier gas in which the particles are entrained.

In accordance with one aspect of the invention, the rate of introduction of polymer composition particles into the carrier gas, as well as the carrier gas velocity, may be adjusted to maximize the delivery of melted polymer composition particles to the substrate surface while, at the same time, preventing re-fusing and chain scissioning of the particles.

In accordance with another aspect of the invention, the proportion of constituent plasma gases, such as argon and helium, are selected to further reduce the temperature of the plasma jet for certain polymers with very low melting points so that the polymers will still be melted but not chain scissioned prior to striking a target surface. Adjusting the proportions of the various plasma gas constituents is an effective tool for controlling the temperature of the plasma jet and thus for controlling the melting and deposition of the particulate material being sprayed onto a substrate.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
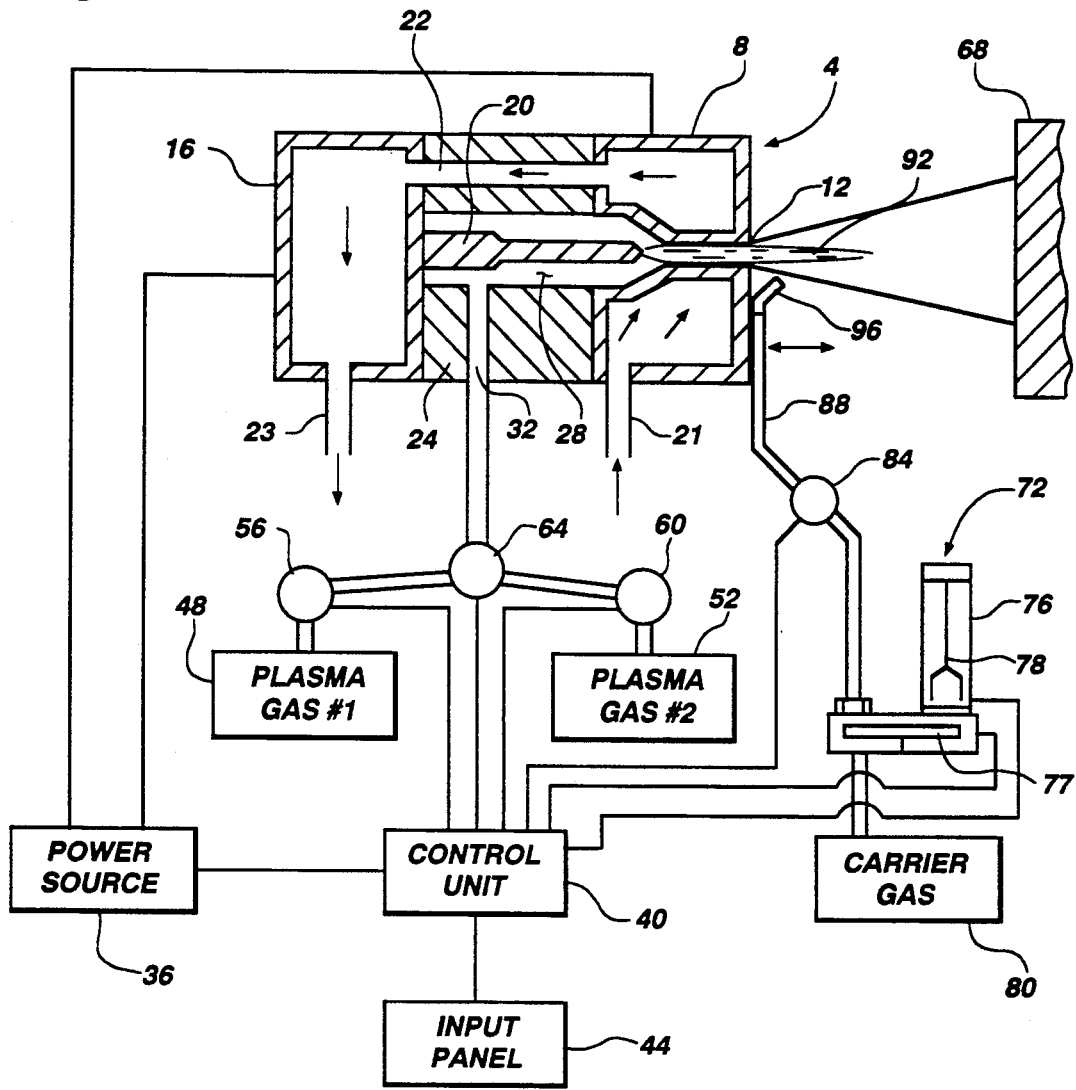
FIG. 1 is a diagrammatic representation of a plasma spray system suitable for use in practicing the present invention.

Referring to FIG. 1, there is shown a plasma spray system suitable for use with the method of the present invention. The plasma spray system shown is a diagrammatic representation of a system manufactured by Plasma-Technik AG of Switzerland and known as Model M-500 T, fully described in the Plasma-Technik Operating Manual, which is incorporated herein by reference. This system was designed to plasma spray ceramics, metals and ceramic-metal combinations, and has been used in one instance for spraying a composition of polyester, silica and alumina, but not for spraying polymers or polymer compositions per se.

The plasma spray system of FIG. 1 includes a plasma gun 4 which, although not shown, could include a handle for manually holding the gun. The plasma gun 4 includes a hollow annular anode/nozzle 8 made of an electrically conductive material and formed with a central bore 12. Spaced rearwardly of the anode/nozzle 8 is a hollow cylindrical jacket 16, made of an electrically conductive material. An elongate cathode 20 extends forwardly from the jacket 16 toward the bore 12 of the anode/nozzle 8, and is electrically connected to the jacket. The diameter of the bore 12 might illustratively be about ¼ of an inch. The diameter of the cathode 20 might likewise be about ¼ of an inch.

The hollow anode/nozzle 8 and jacket 16 are for holding cooling fluid, typically water, for circulation through the plasma gun 4 as indicated by the arrows. The cooling fluid enters the anode/nozzle 8 via a conduit 21 from a source or heat exchanger not shown, passes through a conduit 22 to the hollow jacket 16, and from there out through a conduit 23 to a cooling fluid sink or heat exchanger. All this is conventional in the plasma spraying art.

A hollow cylindrical insulator material 24 is disposed between the jacket 16 and anode/nozzle 8 to define a chamber 28 in which the cathode 20 is disposed and in which a plasma stream or jet is developed. A radial inlet conduit 32 is formed in the insulation material 24 through which ionizable plasma gas is supplied to the chamber 28 under pressure.

A variable power source 36 develops selectable levels of power to supply selectable levels of current to the jacket 16 and thus the cathode 20 and to the anode/nozzle 8 to thereby allow development of an electric arc between the cathode and the anode/nozzle in the presence of an ionizable plasma gas. A plasma jet is thus produced in the chamber 28 to issue through the anode/nozzle 8 and out the bore 12. The power source 36 could be any conventional power source whose output is variable, such as the PT-500 PTS power source utilized in the Plasma-Technik plasma spray system M-500 T. The power output of the power source 36 may be varied between 0 and 75 kw to produce current levels between 0 and 550 amps. Typical current levels used for plasma spraying of polymers is from 450 to 550 amps.

The level of current supplied to the plasma spray gun 4 is controlled by a control unit 40 which might illustratively comprise a conventional stored program computer or microprocessor such as the M-500 ICU control unit utilized in the Plasma-Technik system M-500 T. A push button input panel 44 allows for manually inputting to the control unit 40 the values of the parameters of the plasma spraying process which are desired for a particular spraying operation. This will be discussed in further detail later. The input panel 44 might illustratively be the RCU 500 remote control unit utilized in the Plasma-Technik system M-500 T. Of course, a variety of input devices could be utilized for providing the parameter settings to the control unit 40 for operating the system of FIG. 1.

The ionizable plasma gas for supply to the chamber 28 is provided from two sources or tanks 48 and 52 under control of the control unit 40. The sources 48 and 52 are coupled by mass-flow gas regulators or controllers 56 and 60 to a third mass-flow gas controller 64 which, in turn, is connected to the conduit 32 leading to the plasma chamber 28. The control unit 40 controls the settings of the mass-flow ga controllers 56, 60 and 64 to establish both the proportion of gases from the two sources in the mixture supplied to the plasma gun 4 (by the settings of mass-flow gas controllers 56 and 60), and also the flow rate of the plasma gas mixture to the plasma gun (by the setting of mass-flow gas controller 64).

The kind of plasma gases typically used include argon, helium, nitrogen and hydrogen. Of course, only a single plasma gas may be desirable in which case one of the mass-flow gas controllers 56 or 60 would be completely closed and the other one of the two controllers would be opened to allow the gas from the corresponding source to flow to mass-flow gas controller 64 and to the conduit 32 By the careful selection and control of the mixture of plasma gases used, the polymer spraying process and the resulting polymer coatings can be improved. For example, in order to lower the plasma jet temperature sufficiently to prevent chain scissioning of certain polymers during the spraying process, mixing some helium with argon for the plasma gas may be necessary or at least advantageous. If it is desired to increase the plasma jet temperature, then mixing some hydrogen gas with argon gas will serve to do this.

The plasma gas flow rate in the system of FIG. 1 may be varied between 0 to 30 liters per minute, but for plasma spraying of most polymers, a rate of from 20 to 25 liters/min. is generally suitable.

The polymer or polymer composition to be coated onto a substrate 68 is supplied to the plasma gun 4 in powder form from a powder feeder 72. The powder feeder 72 includes a powder hopper 76, for holding the polymer powder, and a powder disk 77 for receiving powder from the hopper and for rotating at rates which are established by the control unit 40 as a result of input settings from the input panel 44, to deliver the powder to a carrier gas stream which is supplied by a carrier gas source 80. The rate of rotation of the powder disk 77 determines the powder feed rate. The powder hopper 76 includes a stirrer 78 for rotating to keep the powder composition moving onto the powder disk 77.

The carrier gas source 80 is a source of inert gas, such as argon, which under pressure is supplied to the powder feeder 72, the output of which is coupled to another mass-flow gas controller 84 which, in turn, is coupled to a conduit 88 which terminates in an exit nozzle 96 adjacent to the plasma jet 92 produced by the plasma gun 4. The carrier gas velocity is controlled by the setting of the mass-flow gas controller 84. Carrier gas flow rates may range from 0 to about 4 liters/minute, with a flow rate of about 1.5 to 2.5 liters/minute being preferred. The powder feeder 72 might illustratively be Model 5001 P-10 which is used with the Plasma-Technik system M-500 T. Powder feed rates of between 100 grams per hour and 12,000 grams per hour (depending on the powder used) are possible with this system.

It will be noted that the exit nozzle 96 of the powder feed conduit 88 is formed at an angle with respect to the axis of the plasma jet 92. This is to illustrate that the polymer composition powder may be fed to the plasma jet 92 at angles other than 90 degrees (which is typical for many plasma spray systems) to assist in controlling the depth or radial distance of injection of the powder into the plasma jet. It is desired that the powder not reach the very hot center flame portion of the jet, where the powder is more likely to be chain scissioned even if not vaporized. This is illustrated further in FIG. 2 where the cathode 20 is shown with the plasma jet 92 issuing therefrom. The plasma jet 92 is shown to include a hot center flame portion 100 and a cooler outer plume 104. Although the transition between the center flame portion 100 and the plume 104 is not abrupt but rather more gradual in temperature gradient, the point of the illustration is that the center portion of a plasma jet or stream is at a much higher temperature than the outer plume portion. See, for example, "Thermal Spray Research and Applications," *Proceedings of the Third National Thermal Spray Conference Long Beach, Calif., U.S.A./20-25,* May 1990.

Figure 2:
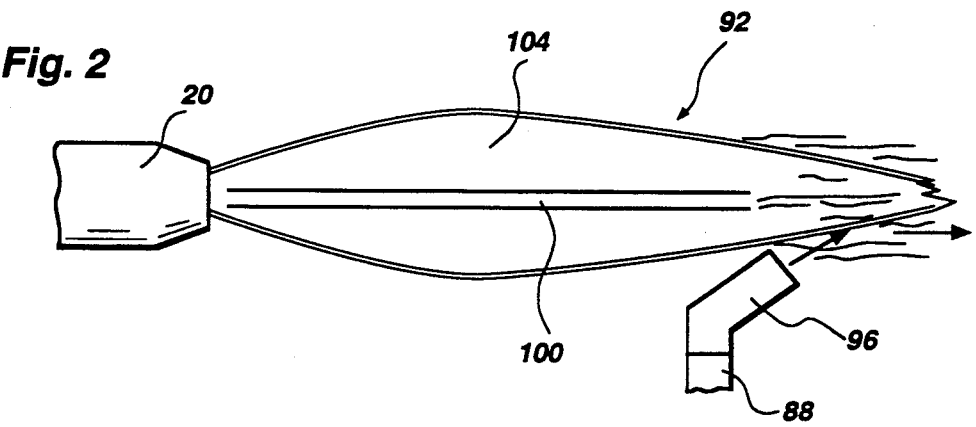
FIG. 2 is a diagrammatic representation of a plasma jet illustrating the central flame section and the surrounding plume.

If the polymer composition is allowed to enter the center portion of the plasma jet 92, much of the polymer composition will be vaporized or at least chain scissioned prior to striking the target surface so that the resulting coating, to the extent there is one, will be nonuniform, filled with voids, rough, and subject to early peeling and delaminating. On the other hand, by angling the powder feed nozzle 96, such as illustrated in FIG. 2, and by controlling the velocity of the carrier gas, the powder can be injected into the plume of the plasma jet 92 to selected depths so as to control melting of the polymer composition and prevent the composition from reaching the very hot center portion. The velocity of the carrier gas is important since if the velocity is too high, the polymer composition powder may be blown or forced too far toward the center of the plasma jet, whereas with a lower velocity, the powder will not penetrate the plasma jet as far. The angle of injection of the powder may be selected by selecting and installing a nozzle 96 having a desired angle relative to the plasma jet. Variously angled nozzles 96 and the powder feed conduit 88 could be compatibly threaded to allow for screwing the nozzles onto and unscrewing the nozzles from the conduit, depending on the nozzle angle desired. Varying the angle of injection also operates to vary the location downstream from the anode/-nozzle 8 at which the powder enters the plasma jet. However, the position of the powder feed nozzle 96 downstream of the anode/nozzle 8 could be made independently adjustable so that either the angle of injection or the location of injection downstream, or both, could be varied. For the system of FIG. 1, the angle of injection may be varied from 75 degrees to 105 degrees (from the direction of travel of the plasma jet) and the location of injection downstream of the anode/nozzle 8 may be varied from about 0.1 to 0.5 inches.

It might be noted that at least one prior art reference discusses controlling the angle of injection of the particles to be coated, but this was for controlling the dwell time of the particles in the plasma jet and not for controlling the depth of penetration of the particles into the jet. See U.S. Pat. No. 3,914,573. Of course, in this reference, only metals and ceramics are discussed as coatings for the plasma spray process, and these materials are typically injected into the center of the plasma jet. See, for example, U.S. Pat. No. 5,047,612.

One other parameter of the plasma spray process which is important for the effective spraying of polymers to coat a substrate is the distance from the anode/-nozzle 8 to the substrate. This distance ranges from about 2 to 6 inches.

With the plasma spray system of FIG. 1, a number of the parameters of the plasma spray process may be controlled, including the power or current level delivered to the cathode and anode combination of the plasma gun 4, the flow rate of plasma gas via the conduit 32 to the chamber 28, the flow rate and velocity of the carrier gas flowing in conduit 88, the powder feed rate of polymer composition powder to the carrier gas stream, and the angle and location downstream of the anode/nozzle 8 of injection of the polymer composition. The values or levels of the first four mentioned parameters are established by keying on the input panel 44 the desired values; the control unit 40 then automatically and precisely establishes these levels for the system by applying electrical signals to the power source 36, mass-flow gas controllers 64 and 84, and powder feeder 72. In addition, the proportion of plasma gases may also be selected by appropriate settings of the mass-flow gas controllers 56 and 60, assuming that a mixture of two plasma gases is desired. Finally, the position of injection of the powder downstream of the anode/nozzle 8, and the angle thereof, may be selected manually as desired. In effect, seven different variables or parameters of the plasma spray process may be controlled to allow for optimizing the plasma spraying of polymer compositions onto a substrate or other surface.

An exemplary method of operating the system of FIG. 1 to spray polymer compositions onto a substrate 68 will now be briefly described. The desired plasma gases would first be selected and plasma gas sources or containers 48 and 52 would be put in place in the system of FIG. 1 and coupled to the mass-flow gas controllers 56 and 60. Such containers would hold the respective plasma gases under pressure of about 90 psi. The system would then be "powered up" by turning on the power switch of the control unit 40 (not shown) and the cooling fluid supply would be activated to supply cooling fluid to the anode/nozzle 8 and hollow jacket 16, for example, by turning on a heat exchanger source for such fluid. Next, the desired current level to be supplied by the power source 36 would be keyed on the input panel 44 and the desired mixture of the plasma gases and the flow rate of the mixture is keyed on the input panel. The parameters for the carrier gas velocity and flow rate and powder feed rate are then keyed on the input panel 44. The final parameter settings are the selection and installation of the appropriately angled powder feed nozzle 96 to inject the powder at a desired angle and location downstream of the anode/nozzle 8.

After all of the parameters have been set, the system of FIG. is placed in the operating condition and plasma spraying begins. While in operation, the parameters may be changed if, upon visual inspection of the coating being applied to the substrate 68, it appears to be warranted. In particular, the parameters may be established to develop an appropriate temperature for the plasma jet 92 for the particular polymer composition being applied so that the composition melts but does not chain scission or re-fuse before reaching the substrate. The melting points of polymers generally range between 200 and 900 degrees F. The temperature of the plasma jet 92 may be increased by increasing the current supplied to the combination cathode and anode of the plasma gun 4, and vice versa, while the temperature may be lowered by increasing the plasma gas flow, and vice versa. As already indicated, the temperature of the plasma jet may also be controlled by controlling the proportion of constituent plasma gases supplied to the chamber 28 to produce the jet. For example, the greater is the proportion of helium in a helium-argon mixture, the lower is the plasma jet temperature, and vice versa.

Chain scissioning of polymers occurs when a certain temperature/time factor results for polymers supplied to a plasma jet. In particular, for given combinations of temperature and time periods to which a polymer is subjected, chain scissioning may occur and when it does, the polymer is degraded and will not provide a suitably dense, well-compacted and void-free coating. The higher the temperature, the lower is the time period over which the polymer need be subjected to that temperature to cause chain scissioning and vice versa. This is the temperature/time factor of chain scissioning referred to here. Thus, in addition to controlling the temperature to which the polymer composition is subjected, controlling the time of travel of the melted polymer composition from the plasma gun 4 to the substrate 68 will also serve to control and prevent chain scissioning of the composition before it reaches the substrate. The travel time may be decreased by increasing the electrical current supplied to the plasma gun but this, in turn, causes an increase in temperature. Similarly the travel time may be decreased by increasing the rate of supply of the plasma gas since then plasma production is increased and the plasma jet speed increases but, perhaps surprisingly, the temperature decreases. In any case, the velocity of the plasma jet 92 and thus the travel time of melted polymer composition to the substrate 68 may be controlled by controlling the temperature and rate of plasma gas supply. Travel time, of course, is also affected by the distance between the anode/nozzle 8 and the surface being coated.

Additional parameters which may be controlled to control the temperature to which the polymer composition is subjected are the axial or longitudinal location and the radial location in the plasma jet where the polymer composition is injected. The farther away from the anode/nozzle 8 and the farther from the center flame portion of the jet, the lower is the temperature and vice versa. The axial location of injection is determined by the downstream position of the powder feed nozzle 96, and the radial location or depth of injection is determined by both the carrier gas velocity and the angle of injection of the composition, as previously discussed. In addition, the powder feed rate also affects the melting and chain scissioning of the polymer composition since if more powder is fed to the plasma jet 92, there will be more powder to absorb the heat energy of the jet and this will tend to reduce the chain scissioning, if any, which may occur.

As evident from the above, there is an interrelationship of the parameters of the plasma spraying process and all of the parameters play some role i controlling the desired melting of the polymer composition and the undesired chain scissioning or re-fusing prior to the polymer composition reaching the substrate. It has been found that by appropriate control of these parameters, a variety of polymer compositions may be plasma sprayed onto a substrate to achieve a well-compacted, dense and void-free coating, previously not acheivable with any prior art approaches. Additionally, the polymer spray rate can be maximized for the plasma system dimensions, without diminishing the quality of the resulting coating.

The method of the present invention is further illustrated by the following experimental examples:

EXAMPLE I

A composition of ultra high molecular weight polyethylene was deposited onto steel, aluminum and epoxy composite substrates with the operating parameters for the Plasma-Technik Model M-500 T plasma spray system set as follows:
Plasma gas: argon
Plasma gas flow rate: 20 liters/minute
Plasma gun current: 500 amps.
Speed of powder disk: 10 r.p.m.
Hopper speed (stirrer): 30 r.p.m.
Carrier gas flow rate: 1.5 liters/minute
Distance to substrate:
  2.75 inches for steel substrate
  3.5 inches for aluminum substrate
  4.25 inches for composite substrate

EXAMPLE II

An elastomer known under the trade name of Styrenic block copolymer was deposited onto steel, aluminum and epoxy composite substrates with the operating parameters of the Model M-500 T system set as follows:
Plasma gas: argon
Plasma gas flow rate: 25 liters/minute
Plasma gun current: 450 amps
Speed of powder disk: 25 r.p.m.
Hopper speed (stirrer): 45 r.p.m.
Carrier gas flow rate: 2.0-2.5 liters/minute
Distance to substrate:
  4.0 inches for steel substrate
  4.75 inches for aluminum substrate
  5.5 inches for composite substrate

EXAMPLE III

A composition of polyvinylidene fluoride (PVDF) was deposited onto steel, aluminum and epoxy composite substrates with the operating parameters of the Model M-500 T system set as follows:
Plasma gas: argon
Plasma gas flow rate: 30 liters/minute
Plasma gun current: 500 amps
Speed of powder disk: 22.5 r.p.m.
Hopper speed (stirrer): 55 r.p.m.
Carrier gas flow rate: 2.0 liters/minute
Distance to substrate:
  3.5 inches for steel substrate
  4.25 inches for aluminum substrate
  5.0 inches for composite substrate

EXAMPLE IV

A composition of polytetrafluoroethylene (PTFE) was deposited onto steel, aluminum and epoxy composite substrates with the operating parameters of the Model M-500 T system set as follows:
Plasma gas: argon
Plasma gas flow rate: 25 liters/minute
Plasma gas current: 500 amps
Speed of powder disk: 25 r.p.m.
Hopper speed (stirrer): 55 r.p.m.
Carrier gas flow rate: 2.5 liters/minute
Distance to substrate:
  2.5 inches for steel substrate
  3.25 inches for aluminum substrate
  4.0 inches for composite substrate The position and angle of injection of the polymer composite in the plasma jet for Examples I, II and III above respectively 0.48 inches downstream of the anode/nozzle and 105 degrees relative to the axis of the plasma jet. For Example IV, the position of injection downstream was 0.20 inches and the angle of injection was 90 degrees.

It is to be understood that the above-described arrangements are only illustrative of the application of the principles of the present invention. Numerous modifications and alternative arrangements may be devised by those skilled in the art without departing from the spirit and scope of the invention and the appended claims are intended to cover such modifications and arrangements.

What is claimed is:

1. A method of plasma spraying polymer compositions onto a surface comprising
   (a) developing an electric potential between a cathode and an anode/nozzle,
   (b) supplying a plasma gas to the cathode and anode/nozzle at a selectable rate to produce a plasma jet, having a central flame and a surrounding plume, which exits the nozzle,
   (c) supplying a powdered polymer composition to the plasma plume at a selectable location downstream of the nozzle and at a selectable rate, to melt the composition,
   (d) directing the plasma jet and melted polymer composition toward the surface,
   (e) controlling the plasma gas rate and location of supply of the composition to the plume so that the melted polymer composition strikes and coats the surface before either re-fusing or chain scissioning of the polymer composition, and
   (g) controlling the powdered polymer composition supply rate so that the maximum amount of polymer composition reaches the surface, relative to the other parameters of the method, and so that the polymer composition, after melting, does not re-fuse or chain scission before striking the surface.

2. A method as in claim 1 wherein step (c) further comprises supplying a carrier gas stream at a selectable velocity to the plasma plume, and supplying the powdered polymer composition to the carrier gas stream at a selectable rate.

3. A method as in claim 2 wherein step (c) further comprises controlling the carrier gas stream velocity to thereby control the depth of penetration of the powdered polymer composition into the plasma plume so that the polymer composition is melted but is not thereafter re-fused or chain scissioned prior to striking the surface.

4. A method of plasma spraying polymer compositions onto a surface comprising
   (a) developing an electric potential between a cathode and an anode/nozzle,
   (b) supplying a plasma gas to the cathode and anode/nozzle to produce a plasma jet, having a central flame and a surrounding plume, which exits the nozzle, wherein the plasma gas is a mixture of argon and helium, and wherein the proportion of helium gas to argon gas is selectable,
   (c) supplying a powdered polymer composition to the plasma plume at a location in the plume downstream of the nozzle to melt the composition,
   (d) directing the plasma jet and melted polymer composition toward the surface, and
   (e) controlling the proportion of helium gas to argon gas in the plasma gas so that the polymer composition melts upon introduction into the plume but does not re-fuse or chain scission before striking the surface.

5. A method of coating a substrate with a polymer composition by plasma spraying comprising the steps of
   (a) producing a plasma jet at a selectively variable power level,
   (b) directing the plasma jet out of the nozzle toward the substrate,
   (c) generating a carried gas stream at a variable rate and directing it into the plasma jet,
   (d) introducing the particulate polymer composition into the carrier gas stream at variable rates, and
   (e) adjusting the power level of the plasma jet, the carrier gas stream rate and the particulate polymer composition introduction rate so that the coating rate on the substrate is maximized, and so that the composition melts but does not thereafter re-fuse or chain scission before it strikes and coats the substrate.

6. A process for applying a polymer coating to a target surface comprising
   (a) generating a plasma plume for discharge through a nozzle,
   (b) supplying a carrier gas at a selectable velocity and rate to the plasma plume at a selectable location downstream of the nozzle, said carrier gas including polymer particles which are thus injected into the plasma plume,
   (c) directing the plasma plume at the target surface, and
   (d) controlling the carrier gas velocity and rate, and supply location to the plasma plume to cause the polymer particles to melt, but not re-fuse or chain scission, prior to contacting the target surface.

7. A process as in claim 6 wherein step (b) comprises supplying the polymer particles to the carrier gas at a selectable rate.

8. A method of operating a plasma spray system to apply to a surface of polymer composition having a certain melting temperature range and a certain chain scissioning temperature/time factor, said system including means for developing an electric arc in the presence of an ionizable gas, from an input electrical power whose magnitude may be selectively varied, means for supplying ionizable plasma gas to the electric arc developing means at selectable rates to thereby produce a plasma jet which issues from a nozzle, means for supplying a carrier gas to the plasma jet at selectable velocities and rates and at selectable locations downstream of the nozzle, and means for feeding polymer composition particles to the carrier gas at selectable rates, the carrier gas thereby delivering the particles to the plasma jet, said method including the steps of
   (a) activating the plasma spray system to develop a plasma jet to which are supplied polymer composition particles,
   (b) directing the plasma jet, with particles, toward the surface, and
   (c) controlling the magnitude of the electrical power, the plasma gas rate, the location of supply of the carrier gas, with the polymer composition particles, to the plasma jet so that the particles are melted, and controlling the carrier gas supply velocity to thereby control the depth of penetration of the polymer composition particles into the plasma jet so that the particles are melted but not thereafter re-fused or chain scissioned before reaching the surface.

9. A method as in claim 8 wherein step (c) further comprises controlling the polymer composition particle feed rate to maximize the rate at which polymer composition is applied to the surface, while maintaining the composition in the melted state without undergoing chain scissioning.

10. A method as in claim 8 wherein the plasma gas is a selectable mixture of argon and helium, said method further including the step of controlling the mixture of argon and helium in the plasma gas so that after melting, the particles are delivered to the surface before re-fusing or chain scissioning.

11. A method of plasma spraying polymer compositions onto a surface comprising
  (a) generating a plasma jet for discharge through a nozzle,
  (b) injecting a powdered polymer composition into the plasma jet at a selectable location downstream of the nozzle, and to a selectable radial depth into the plasma jet to melt the composition, including supplying a carried gas stream at a selectable velocity to the plasma jet, and supplying the powdered polymer composition to the carrier gas stream,
  (c) directing the plasma jet and melted polymer composition toward the surface, and
  (d) controlling the location downstream of the nozzle and the velocity of the carrier gas stream to thereby control the radial depth of injection of the polymer composition into the plasma jet so that the melted polymer composition strikes and coats the surface before either re-fusing or chain scissioning of the polymer composition.

* * * * *